J. C. POTTER.
TOOL FOR MACHINING BEVEL GEAR BLANKS AND OTHER OBJECTS WITH INCLINED SURFACES.
APPLICATION FILED NOV. 28, 1910.
1,109,301.
Patented Sept. 1, 1914.
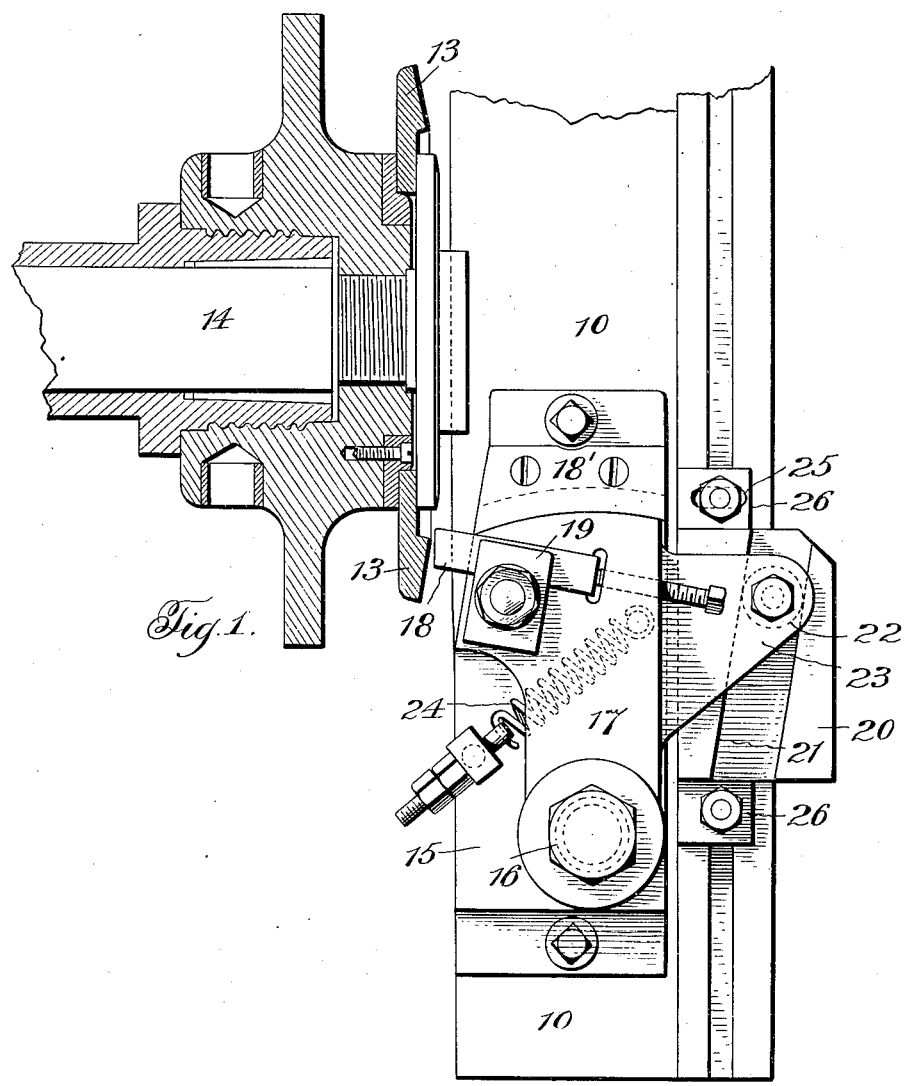

J. C. POTTER.
TOOL FOR MACHINING BEVEL GEAR BLANKS AND OTHER OBJECTS WITH INCLINED SURFACES.
APPLICATION FILED NOV. 28, 1910.
1,109,301.
Patented Sept. 1, 1914.
2 SHEETS—SHEET 2.
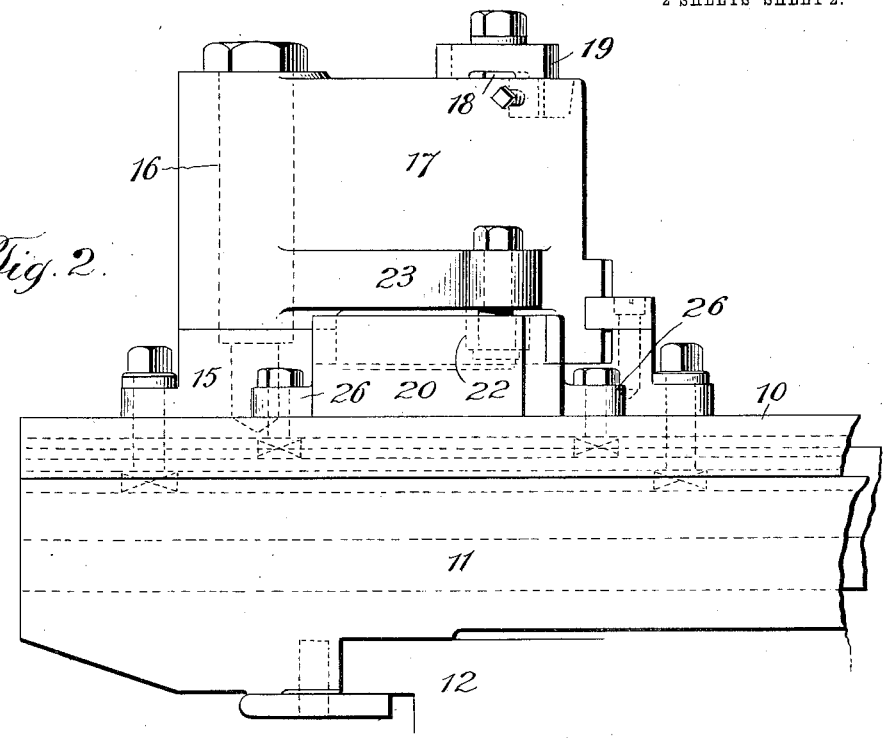
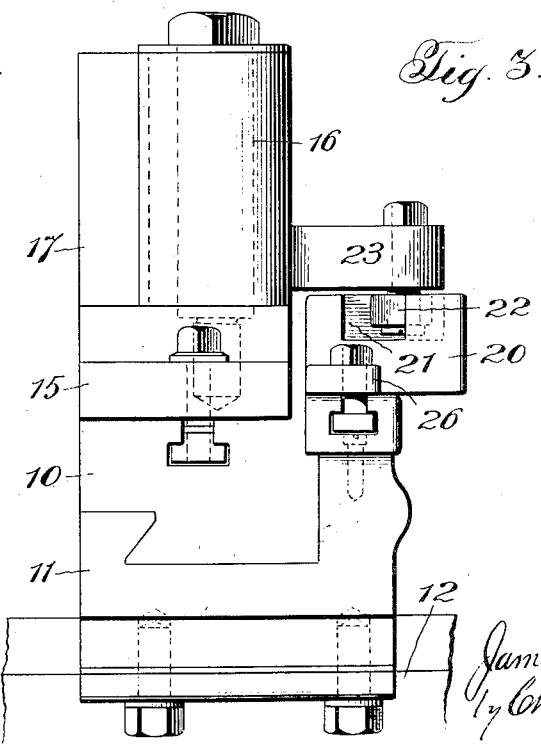

UNITED STATES PATENT OFFICE.

JAMES CHARLES POTTER, OF PROVIDENCE, RHODE ISLAND, ASSIGNOR TO POTTER & JOHNSTON MACHINE COMPANY, OF PAWTUCKET, RHODE ISLAND.

TOOL FOR MACHINING BEVEL-GEAR BLANKS AND OTHER OBJECTS WITH INCLINED SURFACES.

1,109,301.  Specification of Letters Patent.  Patented Sept. 1, 1914.

Application filed November 28, 1910. Serial No. 594,586.

*To all whom it may concern:*

Be it known that I, JAMES C. POTTER, of Pawtucket, in the county of Providence, and in the State of Rhode Island, have invented a certain new and useful Improvement in Tools for Machining Bevel-Gear Blanks and other Objects with Inclined Surfaces, and do hereby declare that the following is a full, clear, and exact description thereof.

The object of my invention is to provide a tool for turning or machining articles such as bevel gear blanks having inclined surfaces, by which the work can be done efficiently and inexpensively and which will be capable of adjustment to suit work of various diameters and having varying angles of surfaces to be machined, and to this end my invention consists in the tool constructed substantially as hereinafter specified and claimed.

In the accompanying drawings—Figure 1 is a top plan view of an embodiment of my invention adapted to the cross slide of an automatic lathe; Fig. 2 a side elevation thereof; and Fig. 3 an end elevation.

In its preferred embodiment, my invention is adapted for use on the cross slide of an automatic lathe, and I, therefore, illustrate in the drawings its use in connection with the cross slide 10 of such a lathe which is of ordinary construction, and, therefore, need not be described in detail, said cross slide 10 being mounted upon a base 11 bolted to the bed 12 of the machine. The work to be machined, being in the instance chosen for illustration, a bevel gear blank 13, is suitably chucked to the machine spindle 14 whose axis, of course, extends at right angles to the path of reciprocation of the cross slide. Mounted upon the upper side of the cross slide is a bracket 15 which is attached to the cross slide by bolts and the usual T-slot in the cross slide, so that said bracket may be adjusted transversely of the lathe bed or toward and from the spindle axis. To a vertical stud or post 16 rising from the bracket, is pivoted a horizontally swinging tool carrier 17 to the upper side of which is clamped a single point tool 18 which projects laterally beyond the tool carrier so as to be in position to engage the broad inclined faces of the bevel gear blank 13 chucked to the spindle when the cross slide is moved inward. The surface of the cross slide bracket on which the pivoted tool carrier rests is a scraped one and the direction of revolution of the work is such that the pressure on the tool carrier is downward so that it has a firm steady bearing, which prevents any chattering of the tool. The free edge of the tool carrier is overhung by a strap 18' bolted to the top of the cross slide and thereby said edge is held in place.

To cause the tool to move in an inclined path during a cutting operation, which will give the desired angle of inclination to the inclined face of the bevel gear blank or other work, I attach a former plate 20 to the upper side of the cross slide base 11, at one side of the tool carrier, said former plate 20 having a side edge 21 which is inclined to the path of travel of the cross slide, and which is engaged by a roller 22 secured to the underside of a lateral projection or arm 23 of the tool carrier, a coil spring 24 attached at one end to the tool carrier and at the other end to the bracket 15 serving to yieldingly hold the roller in contact with said inclined edge of the former plate from which construction it will be seen that when the cross slide moves inward during a cutting operation the contact of the tool carrier roller with the inclined edge of the former plate will cause the cutting point of the tool to describe a path parallel with such inclined edge of the former plate, and upon the outward movement of the cross slide the tool carrier plate will be moved in the opposite direction by the action of said coil spring. The cross slide has a T-slot for the attachment of the former plate thereto, so that it may be adjusted toward and from the axis of the spindle to suit the diameter of work, and the angle of the inclined, carrier moving edge may be changed in order to vary the path of the cutting tool to suit the requirements of different angles of face of work, provision for which may consist of a laterally elongated slot 25 through which passes one of the two attaching bolts 26 that are shown for securing the former plate to the cross slide strap.

It will be understood that the cross slide will be provided with duplicate tools at the front and rear sides of the machine, respectively, but, of course, I do not limit myself to such an arrangement, and it is also to be understood that my invention may be embodied in a turret attachment which, of course, may necessitate some alteration in the details of construction from those suited for a cross slide.

Having thus described my invention what I claim is—

1. In a tool for turning or machining objects having inclined surfaces, the combination of a work holder, a tool-slide movable crosswise of the work holder axis, a tool carrier connected with said slide as to partake of the traversing movement of the slide, said tool carrier being shiftable upon and independently of the tool slide and in a direction crosswise of the work holder axis, a shiftable base upon which said slide is mounted, and an inclined former with which said carrier coacts mounted on said base and shiftable along the same to suit the position of the carrier.

2. In a tool for turning or machining objects having inclined surfaces, the combination of a work holder, a shiftable cross slide base, a cross slide, a bracket on the top of the cross slide adjustable to different positions in the direction in which the cross slide moves and independently of the cross slide, a tool carrier pivoted to the upper side of said bracket, a former having an inclined edge and adjustably mounted on the cross slide base adjacent the cross slide, and a lateral projection on said tool carrier having a member engaging said inclined edge.

In testimony that I claim the foregoing I have hereunto set my hand.

JAMES CHARLES POTTER.

Witnesses:
  EARL H. ROBERTS,
  WILFRID ST. LOUIS.